(12) United States Patent
Driesen et al.

(10) Patent No.: US 8,560,876 B2
(45) Date of Patent: Oct. 15, 2013

(54) CLOCK ACCELERATION OF CPU CORE BASED ON SCANNED RESULT OF TASK FOR PARALLEL EXECUTION CONTROLLING KEY WORD

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 544 days.

(21) Appl. No.: 12/831,086

(22) Filed: Jul. 6, 2010

(65) Prior Publication Data
US 2012/0011389 A1 Jan. 12, 2012

(51) Int. Cl.
*G06F 1/04* (2006.01)
(52) U.S. Cl.
USPC .......................................... 713/600; 713/322
(58) Field of Classification Search
None
See application file for complete search history.

(56) References Cited

U.S. PATENT DOCUMENTS

| | | | |
|---|---|---|---|
| 7,428,651 B2* | 9/2008 | Elbe et al. ...................... | 713/400 |
| 8,112,754 B2* | 2/2012 | Shikano ........................ | 718/102 |
| 8,219,994 B2* | 7/2012 | Topaloglu ..................... | 718/102 |
| 8,347,303 B2* | 1/2013 | Singh et al. ................... | 718/104 |
| 2009/0313629 A1* | 12/2009 | Azuma ......................... | 718/102 |

* cited by examiner

*Primary Examiner* — Ken S. Kim
(74) *Attorney, Agent, or Firm* — Mintz, Levin, Cohn, Ferris, Glovsky and Popeo, P.C.

(57) ABSTRACT

In a computing system having a multi-core central processing unit (CPU) having at least two cores, it is determined that a task to be scheduled meets clock acceleration criteria such as requiring a number of threads less than or equal to a pre-defined threshold and/or having tasks that will run above a pre-determined amount of time. Thereafter, a clock speed of a first core of the CPU is increased and a clock speed of a second core of the CPU is decreased. Once the clock speeds have been adjusted, the task is scheduled to be executed by the first core. Related apparatus, systems, techniques and articles are also described.

14 Claims, 5 Drawing Sheets

CLOCK ACCELERATION OF CPU CORE BASED ON SCANNED RESULT OF TASK FOR PARALLEL EXECUTION CONTROLLING KEY WORD

TECHNICAL FIELD

The subject matter described herein relates to selectively increasing clock speed of a core in a multi-core central processing unit (CPU).

BACKGROUND

The current trend in CPU architecture is to increase the number of cores per CPU. Such an increase in cores differs from past trends in which the main focus was on increasing CPU clock speed because decreasing clock speed can act to reduce power consumption.

Using multi-core CPUs and the accompanying hardware, execution times of long running processes which are executed mainly using single threads will become even longer. This can have a negative impact because for batch processes which utilize only one or a small number of threads and which are not effectively parallelized (or parallelizable). For example, for certain operations, parallelization is not possible, or difficult to achieve. In most convention software architectures, automated parallelization of tasks by the compiled and other infrastructure is limited. Thus, parallelization is not broadly available, but rather, only available for those tasks where the developer of the underlying software has explicitly design same for parallelization. As a result, all other long running tasks will experience an increasing execution runtime.

SUMMARY

In one aspect, in a computing system having a multi-core central processing unit (CPU) having at least two cores, it is determined that a task to be scheduled meets clock acceleration criteria such as requiring a number of threads less than or equal to a pre-defined threshold and/or requiring a run time above or equal to a pre-defined amount of time. Thereafter, a clock speed of a first core of the CPU is increased and a clock speed of a second core of the CPU is decreased. The task is then scheduled to be executed by the first core.

The following variations may be implemented singly or in combination depending on the desired configuration. In some implementations, the pre-defined threshold is a single thread while in other implementations it is several threads (e.g., three threads, etc.). The second core of the CPU can be stopped so that the clock speed of the second core of the CPU is zero or substantially zero. The CPU clock speed can be increased by calling an interface of an operating system of the computing system to increase the clock speed of the corresponding core. Similarly, the CPU clock speed can be decreased by calling the interface of the operating system of the computing system to decrease the clock speed of the corresponding core. Once the task has been scheduled, it can be executed by the first core. The determination of whether the task to be scheduled meets the acceleration criteria can include identifying an attribute associated with at least one of the threads of the task which indicates that it will run above a pre-defined amount of time and/or scanning a code of the task to identify key words that control parallel execution. The CPU can dynamically assign the first core and the second core based on processing states of such cores (such that in some situations a core clock speed is increased and in other situations the clock speed for that same core can be decreased).

In another aspect, in a computing system having a multi-core central processing unit (CPU) having at least a first core and a second core, the first core operating at a clock speed greater than the second core, it is determined that a first task meets clock acceleration criteria. Thereafter, the first task is scheduled to be executed by the first core. It is also determined that a second task to be scheduled requires a number of threads greater than a pre-defined threshold so that the second task is scheduled to be executed by the second core.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current subject matter increases throughput for single/small thread applications while keeping power consumption (and as a result cooling demand) of a CPU below a certain threshold (which is according to the sizing of the power unit and cooling capacity of the computer system). In addition, the current subject matter allows for the runtime of the "long running" single thread task to be reduced independently of the design of the task through the increased clock speed. This approach also provides benefit for tasks which have not been designed for parallel execution (which as stated above comprises a vast majority of tasks in conventional computing systems).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
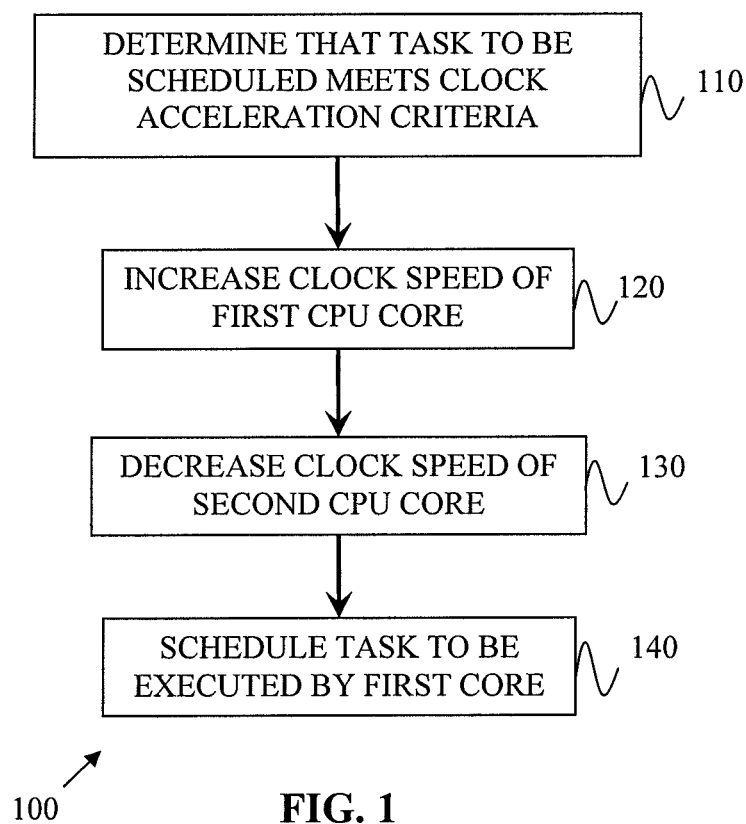
FIG. 1 is a process flow diagram illustrating scheduling of a task meeting clock acceleration criteria by increasing clock speed of a first core of a CPU and decreasing clock speed of a second core of the CPU.

FIG. 1 is a processing flow diagram illustrating a method 100 for implementation on a computing system having a multi-core central processing unit (CPU) having at least two cores in which, at 110, it is determined that a task to be scheduled meets certain clock acceleration criteria. Thereafter, at 120, a clock speed of a first core of the CPU is increased while, at 130, a clock speed of a second core of the CPU is decreased (such actions can occur in any sequence or in parallel). Later, the task is scheduled, at 140, to be executed by the first core.

Figure 2:
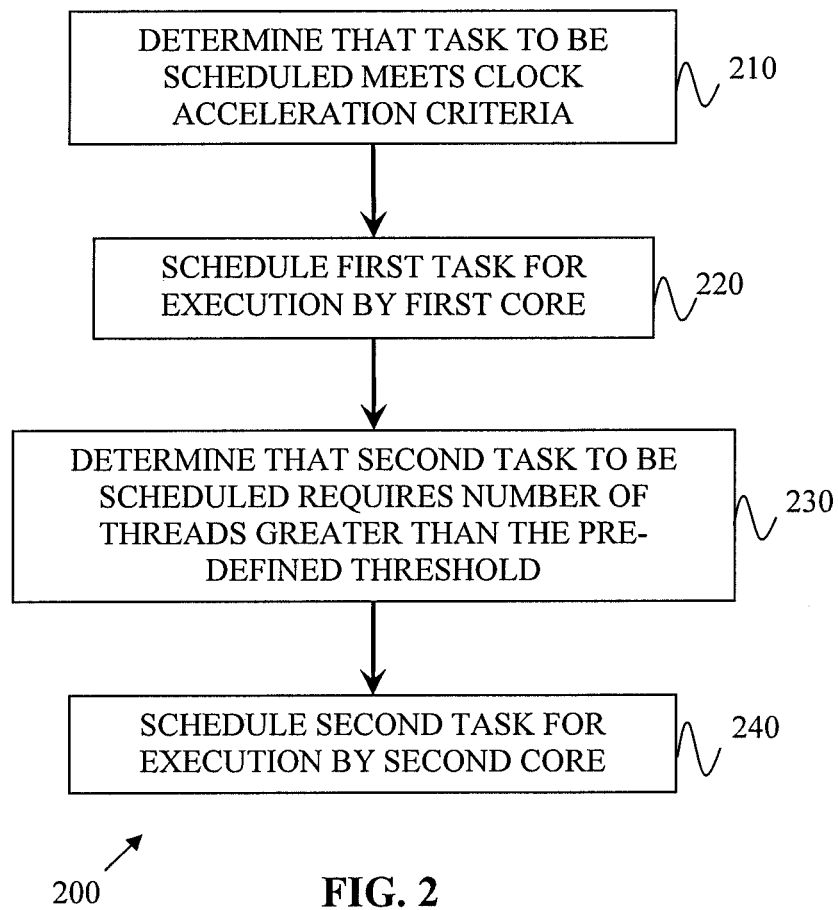
FIG. 2 is a process flow diagram illustrating scheduling of a task meeting clock acceleration criteria by assigning at least a portion of the task to a first core of a CPU which is operating at a higher clock speed than a second core of the CPU.

FIG. 2 is a processing flow diagram illustrating a method 200 for implementation on a computing system having a multi-core central processing unit (CPU) having at least a first core and a second core. In such arrangement, the first core operates or can operate at a clock speed greater than the second core. With the method 200, it is determined, at 210, that a first task to be scheduled meets clock acceleration criteria which results in, at 220, the first task being executed by the first core. It can be also determined, at 230, that a second task to be scheduled requires a number of threads greater than a pre-defined threshold which in turn results in, at 240, the second task being scheduled to be executed by the second core.

The clock acceleration criteria can be based on, for example, the task having a number of threads less than or equal to a pre-defined threshold. In most cases, this pre-defined threshold is a single thread while in other cases it can be a few threads. The clock acceleration criteria can alternatively or additionally include whether the task (or a portion of the task) will run for longer than a pre-defined amount of time. Other clock acceleration criteria can be utilized based on a variety of factors. In some implementations, the determination of whether certain acceleration criteria are met is based on the application layer because the CPU core cannot characterize tasks in such a fashion.

The current subject matter utilizes a CPU with at least two cores. In some arrangements, each core of the CPU has similar features such as clock speed and ability to modify clock speed while in other arrangements certain features differ among the cores. The corresponding CPU architecture utilized by the current subject matter provides an option to selectively increase clock speed of a designated core of a CPU while at the same time reducing the clock speed or simply switching off one or more other cores of the CPU.

A software implemented task scheduler can be used to manage the execution of the scheduling of tasks (e.g., a scheduler within an application server). Such a task scheduler can identify if a task meets clock acceleration criteria such as requiring one or a small number of threads (e.g., by an attribute provided by the creator of the batch job, etc.). If a task is to be scheduled, which meets the clock acceleration criteria, the scheduler can call an interface of the operating system configuring and/or implementing the CPU to increase the clock speed of a first core to execute the thread. Optionally, the scheduler can also call the interface of the operating system to decrease the clock speed of one or more other cores (e.g., a second core) to decrease (including stopping altogether) the corresponding clock speed. In some implementations, the thread started can be provided with an attribute that it meets the clock acceleration criteria (e.g., it will run "long", etc.). The CPU can use this attribute to execute the task on the first core with increased clock speed.

The demand to increase the clock sped of the first core can be passed as one request to the CPU. The related reduction of power consumption and cooling demand can be managed by the CPU using its internal policies or mechanisms. For example, the clock speed of several other cores can be reduced to avoid shutting one core down completely.

The task scheduler can identify that a certain task meets clock acceleration criteria such as it being executed by a single thread only (or by a pre-defined number of threads in excess of 1). This identification can be achieved by providing an attribute with the task (to be maintained, for example, by the author of the task), or (if an interpreted language is used) by scanning the code of the task for key words which control parallel execution (e.g., with SAP system, and ABAP key word "submit"). For compiled languages, such identification can be achieved by the compiler setting the attribute for the program (using known/recognizable key words).

The task scheduler can evaluate task parallelization ability at any point in time. If a task is a single-thread (or "small" thread) operation, the task scheduler can call the operating system command to provide a "speed-up" core (i.e., an instruction to increase the clock speed of a core, etc.). The executable program passed to the core is provided with an attribute that it is a "long" running operation such that the CPU evaluate this information and hands the program to the "speed-up" core.

Figure 3:
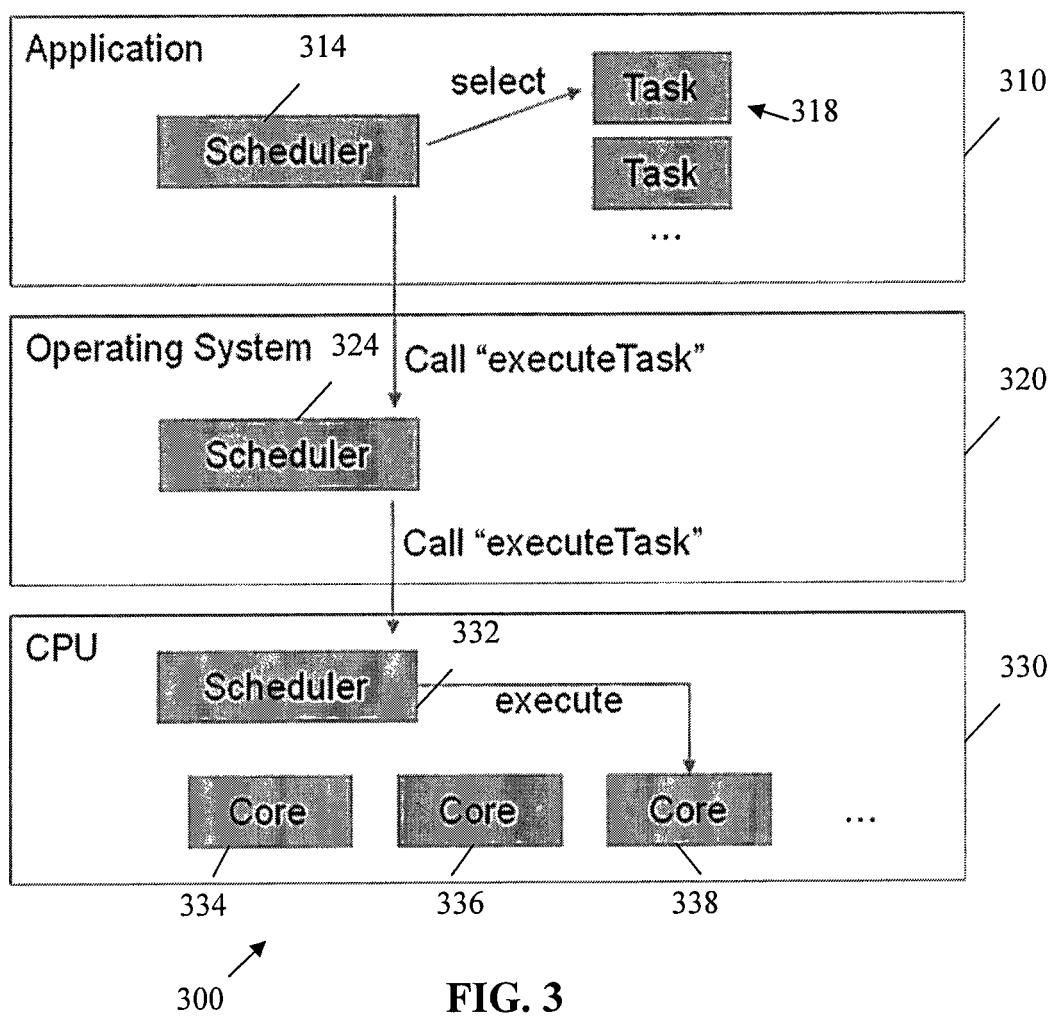
FIG. 3 is a diagram illustrating a conventional scheduling system.
Figure 4:
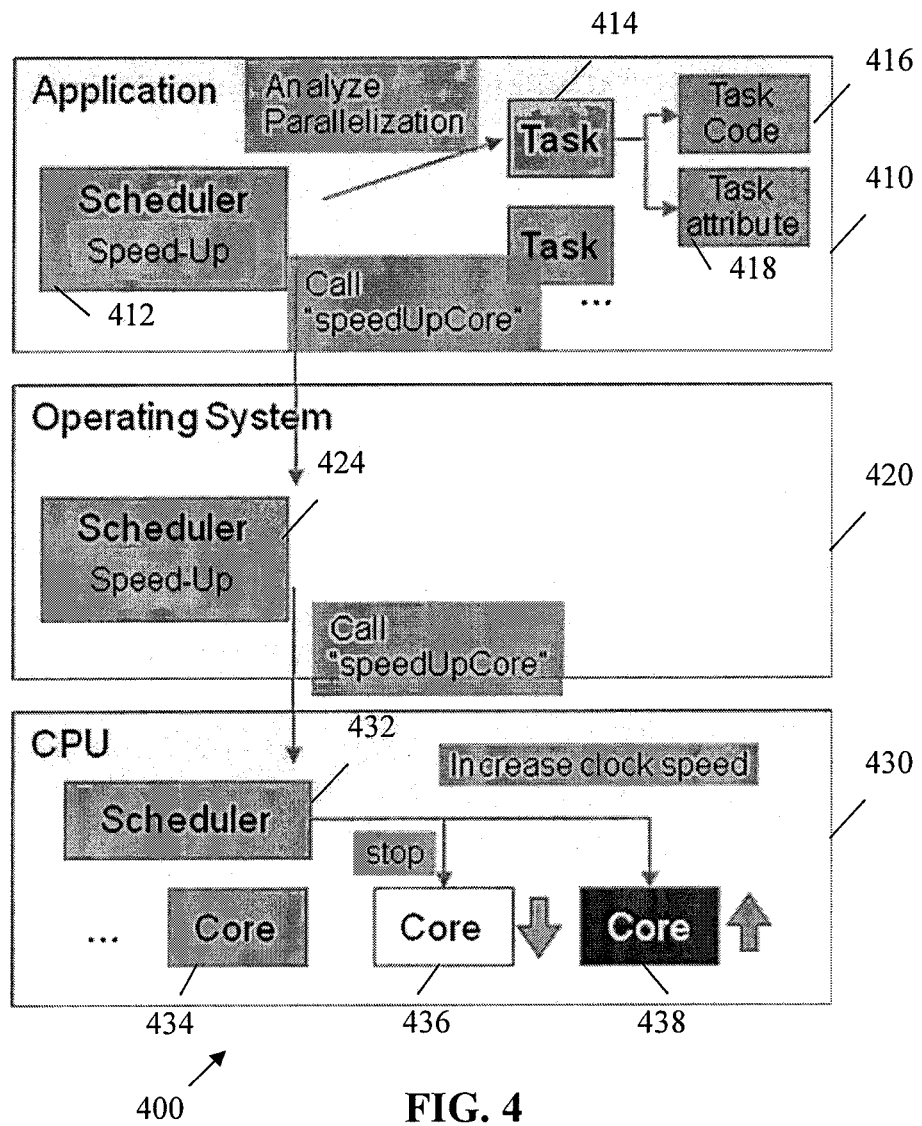
FIG. 4 is a diagram illustrating a scheduling system for implementing a method as in FIG. 1.
Figure 5:
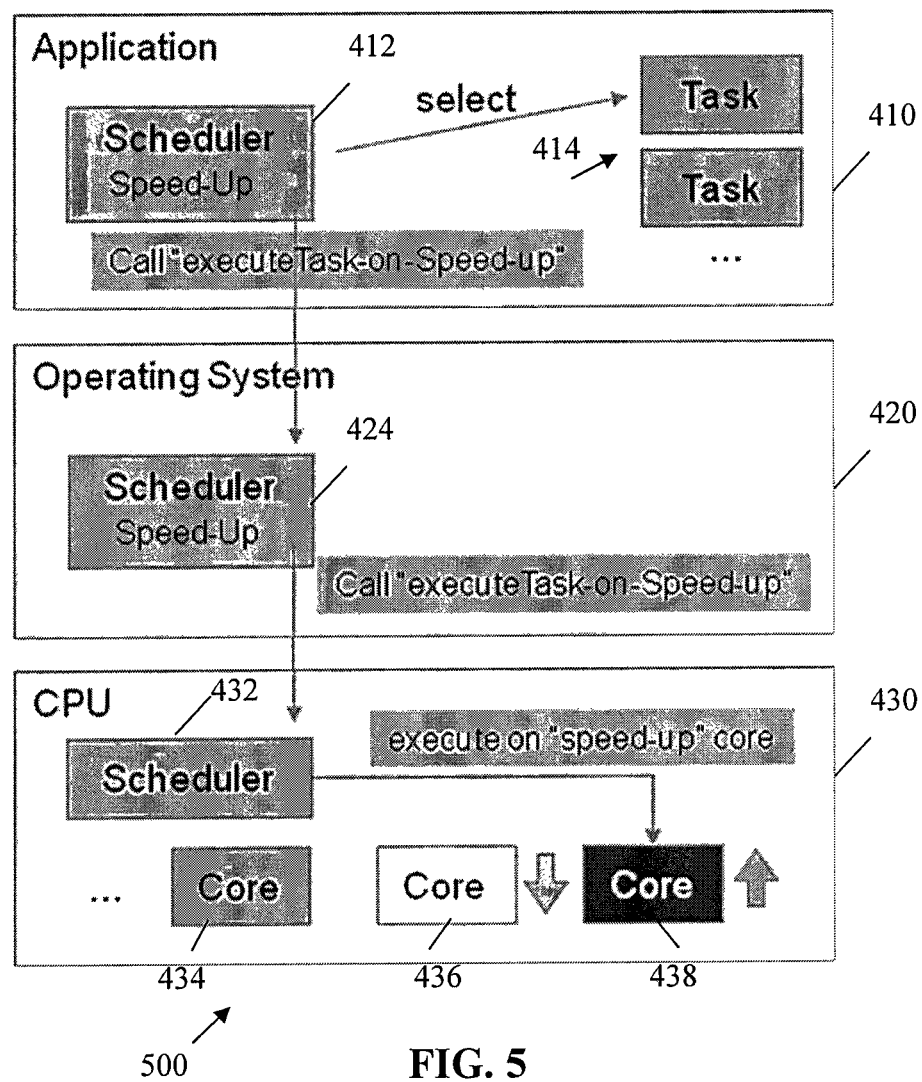
FIG. 5 is a diagram illustrating a scheduling system for implementing a method as in FIG. 2.

FIGS. 3-5 illustrate various arrangements for scheduling tasks with the diagram 300 of FIG. 3 illustrating a conventional arrangement while FIGS. 4 and 5 illustrating the current subject matter. With reference to FIG. 3 a system is illustrated that involves a system 300 that includes an application 310, an operating system 320, and a multi-core CPU 330. An application task scheduler 314 associated with the application 310 selects a task from a task queue 318 which results in the application task scheduler 314 calling the operating system 320 to execute the selected task. Thereafter, an operating task scheduler 324 calls the CPU 330 to execute the selected task. The CPU 330 in turn has a CPU scheduler 332 which causes one of a plurality of cores 334, 336, 338 to execute the selected task without regard to factors such as a number of threads associated with such task. This selection can be based on factors such as processing availability of the selected core.

FIG. 4 is a diagram 400 of a system including an application 410, an operating system 420, and a multi-core CPU 430. An application scheduler 412 handles a tasks queue 414 which includes tasks that can meet certain clock acceleration criteria such as including attributes identifying a corresponding number of threads required for such tasks or requiring a run time above a pre-defined amount of time. This identification can take the form of a task code 416 and/or a task attribute 418. If the application scheduler 412 determines that a task to be scheduled within the task queue 414 requires a number of threads below a predetermined level (e.g., one or less, two or less, etc.) and/or will run above the pre-defined amount of time, then the application scheduler 412 can call the operating system 420. An operating system scheduler 424 can then call the CPU 430 to speed-up a core for which the task has been assigned/scheduled. The CPU 430 can include three cores 434, 436, 438. The call from the operating system 420 can cause a CPU scheduler 432 to increase a clock speed of the third core 438 (for which the task has been assigned). Optionally, the CPU scheduler 430 can cause the clock speed of the second core 436 to decrease. In addition, the clock speed of the first core 434 can be unaltered.

FIG. 5 is a diagram 500 that illustrates an arrangement similar to that of the diagram 400 of FIG. 4. However, in such arrangement, the clock speed of the third core is already "sped up" (whether through previous modification such as that illustrated in FIG. 4 or by manufacturer design or other variations) and selective tasks can be executed by such third core 438 without the CPU scheduler 432 changing any speeds of the cores 434, 436, 438 (or at least the third core 438). FIG. 5 can correspond to the method of FIG. 2 in which clock speeds of cores differ so that tasks can be assigned accordingly based on thread number or other attribute that affects processing consumption levels.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

What is claimed is:

1. A method for implementation on a computing system having a multi-core central processing unit (CPU) having at least two cores, the method comprising:
   determining, by a software implemented task scheduler executing at an application layer, that a task to be scheduled meets clock acceleration criteria, each task comprising at least one thread;
   calling, by the software implemented task scheduler, an interface of an operating system of the computing system to increase a clock speed of a first core of the CPU and to decrease a clock speed of a second core of the CPU; and
   scheduling the task to be executed by the first core;
   wherein:
   the task is encoded with at least one key word, and
   the determining that the task meets the clock acceleration criteria comprises scanning the task to identify key words that control parallel execution.

2. A method as in claim 1, wherein the clock acceleration criteria requires that the task have a number of threads less than or equal to a pre-defined threshold.

3. A method as in claim 2, wherein the pre-defined threshold is one thread.

4. A method as in claim 1, further comprising:
   identifying an attribute associated with the task which indicates that it will run above a pre-defined amount of time;
   wherein the clock acceleration criteria requires that at least one thread of the task will run longer than the pre-defined amount of time.

5. A method as in claim 1, wherein the second core of the CPU is stopped so that the clock speed of the second core of the CPU is zero or substantially zero.

6. A method as in claim 1, further comprising:
   initiating execution of the task by the first core.

7. A method as in claim 1, wherein the CPU dynamically assigns the first core and the second core based on processing states of such cores.

8. An article of manufacture comprising:
   computer executable instructions stored on non-transitory computer readable media, which, when executed by a computer, causes the computer to perform operations comprising:
   determining, by a software implemented task scheduler executing at an application layer, that a task to be scheduled meets clock acceleration criteria, each task comprising at least one thread;
   calling, by the software implemented task scheduler, an interface of an operating system of the computing system to increase a clock speed of a first core of the CPU and to decrease a clock speed of a second core of the CPU; and
   scheduling the task to be executed by the first core;
   wherein:
   the task is encoded with at least one key word, and
   the determining that the task meets the clock acceleration criteria comprises scanning the task to identify key words that control parallel execution.

9. An article as in claim 8, wherein the clock acceleration criteria requires that the task have a number of threads less than or equal to a pre-defined threshold.

10. An article as in claim 9, wherein the pre-defined threshold is one thread.

11. An article as in claim 8, further comprising:
    identifying an attribute associated with the task which indicates that it will run above a pre-defined amount of time;

wherein the clock acceleration criteria requires that at least one thread of the task will run longer than the predefined amount of time.

12. An article as in claim 8, wherein the second core of the CPU is stopped so that the clock speed of the second core of the CPU is zero or substantially zero.

13. An article as in claim 8, wherein the CPU dynamically assigns the first core and the second core based on processing states of such cores.

14. A method for implementation on a computing system having a multi-core central processing unit (CPU) having at least two cores, the method comprising:
- scanning, by a software implemented task scheduler executing at an application layer, a code of a coded task to identify at least one key word to control parallel execution, each task comprising at least one thread;
- calling, by the software implemented task scheduler and based on the at least one identified key word, an interface of an operating system of the computing system to increase a clock speed of a first core of the CPU and to decrease a clock speed of a second core of the CPU; and
- scheduling the task to be executed by the first core.

* * * * *